(12) United States Patent
Takahashi

(10) Patent No.: US 7,006,314 B2
(45) Date of Patent: Feb. 28, 2006

(54) MAGNETIC HEAD DRIVER CIRCUIT AND MAGNETIC STORAGE DEVICE

(75) Inventor: Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 10/288,964

(22) Filed: Nov. 6, 2002

(65) Prior Publication Data

US 2003/0184901 A1    Oct. 2, 2003

(30) Foreign Application Priority Data

Mar. 28, 2002    (JP) .............................. 2002-091739

(51) Int. Cl.
*G11B 5/09*    (2006.01)
(52) U.S. Cl. .............................. 360/46; 360/66; 360/68
(58) Field of Classification Search .................. 360/68, 360/46, 67, 66, 31, 62; 327/108, 110, 52, 327/494, 497, 84
See application file for complete search history.

(56) References Cited

U.S. PATENT DOCUMENTS 6,014,281 A * 1/2000 Contreras ..................... 360/67
6,121,800 A * 9/2000 Leighton et al. ............ 327/110

* cited by examiner

*Primary Examiner*—Alan T. Faber
(74) *Attorney, Agent, or Firm*—Greer, Burns & Crain, Ltd.

(57) ABSTRACT

A driver circuit drives a write element for magnetic recording, and permits high speed recording while preventing noise from entering an adjacent read element. An H bridge circuit, which causes a write current to flow, in accordance with a write drive signal, in a write coil of the write element, is provided with an overshoot circuit, in which positive and negative power sources are of the same potential. It makes a flyback voltage vertically symmetrical. Further, a feedback circuit is provided which monitors the voltages at both ends of the write coil, and prevents a variation in the common potential of the write coil. Terminal resistors are further provided to prevent the effects of reflection in a transmission line, and to prevent a change in the write waveform.

6 Claims, 9 Drawing Sheets

FIG. 12
Prior art
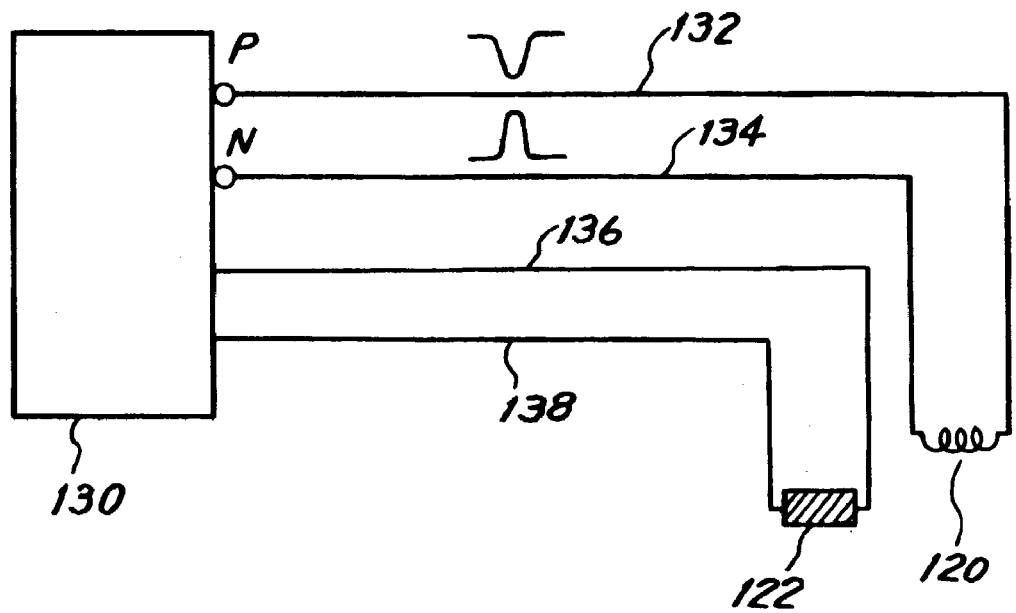
FIG. 13
Prior art
Incident →
Reflection ←
Write wave form
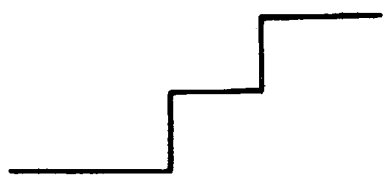

MAGNETIC HEAD DRIVER CIRCUIT AND MAGNETIC STORAGE DEVICE

BACKGROUND OF THE INVENTION

1. Field of the Invention

The present invention relates to a driver circuit for driving a magnetic head that performs recording on a magnetic recording medium, and to a magnetic storage device which employs the driver circuit, and more particularly to a driver circuit for driving a write head which is provided spaced apart from a read head, and to a magnetic storage device.

2. Description of the Related Art

A magnetic recording system records data on a magnetic recording medium using a magnetic head, and magnetic disk devices and magnetic tape devices, and the like, are widely used. In such magnetic recording, an improvement in recording density and improvements in write speed and in read speed are being sought. In order to improve recording density, a magneto resistance element (or giant magneto resistance element), which is a highly sensitive magnetic sensor, is adopted.

On the other hand, since a magneto resistance element is read-only, in order to perform writing, it is necessary to separately provide a write element such as an inductive element. A driver circuit (write driver) is required to drive this write element. FIG. 10 is a constitutional view of a conventional write driver, and FIG. 11 is an explanatory view of the operation of the conventional write driver.

As shown in FIG. 10, the write driver circuit is constituted of an H bridge circuit comprising four NPN-type transistors 100, 102, 104, 106. In other words, pairs of NPN transistors 100 and 102, and 104 and 106, are serially connected in a vertical direction, and a write head (element) 120 is connected to nodes N, P of the pairs of NPN transistors.

Further, a positive potential is applied from a positive power source 110 to the collectors of the upper transistors 100, 104, and a negative power source 112 is connected to the emitters of the lower transistors 102, 106, such that drive is provided using two power sources. In other words, the upper transistors 100, 104 possess a function to supply a potential to the write element 120, and the lower transistors 102, 106 provide the function of causing a current to flow to the write element 120.

By way of explanation of the operation of the driver circuit, assuming that signals A, D of the transistors 100 and 106 are "high", and that the signals B, C of the transistors 102 and 104 are "low", the top left transistor 100 and the bottom right transistor 106 are ON, and, as shown by the dotted line in the figure, a write current flows from left to right in the write element (coil) 120.

On the other hand, also, as shown by the solid line, when a write current is flowing from right to left in the write element 120, signals A to D are inverted and the top right transistor 104 and the bottom left transistor 102 are ON. The value of this write current is controlled by a current source (for example, a resistor) 114 provided therebelow.

FIG. 11 is a transition diagram for the potentials of the nodes N, P on both ends of the write coil 120 when a write current is flowing. As shown in FIG. 11, assuming that the signals B, C of the transistors 104, 102 are "high" and the signals A, D of the transistors 100, 106 are "low", the top right transistor 104 and the bottom left transistor 102 are ON, a write current flows from right to left in the write coil 120. At such time, since the write element 120 is a coil (inductance), after the voltages at both ends thereof have risen to a flyback voltage level, there is convergence between these voltages as a result of a counter electromotive force.

When a current flows from right to left in the write coil 120, the maximum values of this flyback voltage level are, at the node N, (+Vcc−the base potential of the transistor 104), and, at the node P, (−Vee+the base potential of the transistor 102).

With such an H bridge circuit, the application voltages applied to the upper transistors 100, 104, and the lower transistors 102, 106 are different. As a result, as shown in FIG. 11, the flyback voltage levels are vertically asymmetrical.

Meanwhile, in a magnetic storage device, as shown in FIG. 12, the magnetic head is constituted by integrating the write element 120 and a read element (MR element) 122, and the write element 120 and the read element 122 are connected via each of the nodes 132, 134, 136, 138 to an analog IC circuit 130 comprising the write driver described above and a read amp, or the like.

According to such a conventional write driver constitution, first, since the flyback voltage is vertically asymmetric, as shown in FIG. 11, the voltage in a center position of the write element 120 (known as the common voltage) also changes in accordance with a vertical flyback voltage difference. And a change to this transitional common voltage enters the read element 122, which is adjacent to the write element 120, as noise.

Also, with a two power-source system H bridge circuit, the common voltage of the write element 120 differs from the ground potential even if in a steady state since this common voltage is determined by the negative power source 112. Since this common voltage is not held at ground potential, the common potential enters the adjacent read element 122 as noise.

Meanwhile, in accordance with the demand in recent years for high density recording, a read element 122 suited to a narrow track width is being sought, for example, minimization of the read element core width to make same on the order of 0.3 to 0.4 micrometers is being sought. On account of such minimization of the core width, the withstand voltage of the read element becomes small.

Therefore, as a result of such noise, a state arises where voltages, which are equal to or greater than those required for the voltages at both ends of the read element, are applied, and there is a risk that, particularly with a read element of narrow core width, in the worst case, this will lead to the destruction of the read element. Even if not attributed to destruction of the read element, since the voltages at both ends of the read element change during writing, there is also the problem of the recovery time taken for the voltage of the read element to return to its original value at the time of write to read recovery.

Secondly, in order to implement high-speed writing, a high write frequency is required. As shown in FIG. 12, a write current flows via a connecting wire 132, the write element 120, and a connecting wire 134. Therefore, whenever the write speed increases, a transmission line impedance cannot be observed in the write waveform. However, in a conventional driver circuit, since no consideration is paid to the effects of reflection, as shown in FIG. 13, as a result of reflected waves, the write waveform rises slowly, and ringing is produced in the write waveform itself. High-speed writing is therefore problematic.

SUMMARY OF THE INVENTION

Accordingly, it is an object of the present invention to provide a magnetic head driver circuit, which serves to diminish the entry of noise into the read element during write driving, and a magnetic storage device.

Further, it is another object of the present invention to provide a magnetic head driver circuit, which serves to reduce the effects of reflection on the write waveform which are caused by a transmission line and to implement high-speed writing, and a magnetic storage device.

It is yet another object of the present invention to provide a magnetic head driver circuit, which performs impedance matching while conserving electric power and serves to reduce dull in the write waveform, and a magnetic storage device.

In order to resolve these objects, one aspect of the magnetic head driver circuit according to the present invention is a circuit, which drives a write element performing magnetic recording on a magnetic recording medium, comprising: a write driver, which is constituted by a first pair of switch elements, which, in accordance with a write drive signal, cause a write current of one direction to flow in a write coil of the write element and by a second pair of switch elements, which cause a write current of a reverse direction to flow in the write coil; and an overshoot circuit, which is connected to a positive power source and a negative power source of the same potential, and which, in sync with the operation of the first and second pairs of switch elements, adds an overshoot current, which serves to prevent a variation in a common potential of the write coil, to the write coil.

According to the present invention, an H bridge circuit (write driver), which drives a write coil in both directions and causes a steady write current to flow, is separately provided with another H bridge circuit generating an overshoot. And since the potentials of the positive power source and negative power source of this bridge circuit are made equal, the flyback (overshoot) voltage can be made vertically symmetrical. It is therefore possible to reduce the production of common noise, and since coupling with the read element is prevented, it is possible to prevent the destruction of the read element and to shorten the write to read recovery time of the read element.

Further, according to the present invention, the overshoot circuit is preferably constituted by a third pair of switch elements, which, in accordance with a drive signal in sync with the above-mentioned write drive signal of the first pair of switch elements, add an overshoot current of one direction to the write coil; and a fourth pair of switch elements, which, in accordance with a drive signal in sync with the above-mentioned write drive signal of the second pair of switch elements, add an overshoot current of a reverse direction to the write coil. Therefore, addition to existing circuit constitutions can be achieved in a straightforward manner, and implementation is simple.

A magnetic head driver circuit according to another aspect of the present invention is a circuit, which drives a write element performing magnetic recording on a magnetic recording medium, comprising: a write driver, which is constituted by a first pair of switch elements, which, in accordance with a write drive signal, cause a write current of one direction to flow in the write coil of the write element and by a second pair of switch elements, which cause a write current of a reverse direction to flow in the write coil; and a feedback circuit, which monitors the voltages at both ends of the write coil and controls a supply voltage which is applied to the write driver.

According to this aspect of the present invention, as a result of adding the feedback circuit, which controls a voltage of the write driver by monitoring the voltages at both ends of the write coil, by determining the center voltage of the write coil, and by comparing these voltages with the ground (GND) potential, even if the vertical circuit of the write driver is not symmetrical, and even if there is a difference between the potentials of the power sources of the write driver, it is possible to control the center potential of the write coil so that this center potential is held at ground (GND) potential. It is thus possible to reduce common noise at the time of a mode change from write to read, to prevent coupling with the read element, and to prevent the destruction of the read element.

According to the present invention, the write driver is preferably driven by a positive power source and a negative power source, and the feedback circuit controls a supply voltage which is applied to the write driver by the positive power source. Addition to existing drivers can therefore be achieved in a straightforward manner.

According to yet another aspect of the present invention, a magnetic head driver circuit, which drives a write element performing magnetic recording on a magnetic recording medium, comprises: a write driver, which is constituted by a first pair of switch elements, which, in accordance with a write drive signal, cause a write current of one direction to flow in a write coil of the write element and by a second pair of switch elements, which cause a write current of a reverse direction to flow in the write coil; and supply terminal resistors, which are provided between the write coil and, of the first and second pairs of switches, the switches on a source side of the write current.

According to this aspect of the present invention, when a steady write current flows in the write coil, since the write current flows from the positive power source (low impedance) via a resistor (supply terminal), the write current rises quickly, and write waveform ringing and the like can be prevented.

In the present invention, it is preferable to further provide a switch, which is provided in parallel with a switch on a destination side of the write current and which selectively connects a receiving terminal resistor, of the write coil, and the above-mentioned terminal resistor to ground.

According to this aspect, double terminals are established by providing switches, which set receiving terminals at the same potential as the terminal voltages (current source side) of the write coil only at a time when reflection effects are present, and by loading terminal resistors only at such time. Therefore, at required times, in addition to constituting double terminals, terminal resistors are also introduced at a potential which is equal to the terminal voltages (current source side) of the write coil, meaning that there is no need to cause a current to flow, which is equal to two times the current flowing in the write coil, by means of a lower power source. Moreover, an effect is also produced whereby it is possible, by means of the double terminals, to shorten the overshoot settling time interval.

Furthermore, according to the present invention, a magnetic head driver circuit, which drives a write element performing magnetic recording on a magnetic recording medium, comprises: a write driver, which is constituted by a first pair of switch elements, which, in accordance with a write drive signal, cause a write current of one direction to flow in a write coil of the write element and by a second pair of switch elements, which cause a write current of a reverse direction to flow in the write coil; an overshoot circuit, which is connected to a positive power source and a negative power source of the same potential, and which, in sync with the operation of the first and second pairs of switch elements, adds an overshoot current, which serves to prevent a variation in the common potential of the write coil, to the write coil; and a feedback circuit, which monitors the voltages at both ends of the write coil and controls a supply voltage which is applied to the write driver.

BRIEF DESCRIPTION OF THE DRAWINGS

FIG. 12 is an explanatory view of a conventional magnetic storage device; and

FIG. 13 is an explanatory view of reflective action as caused by a transmission line of a conventional write driver circuit.

DESCRIPTION OF THE PREFERRED EMBODIMENTS

Embodiments of the present invention are described hereinbelow by way of a magnetic storage device, a write driver circuit and a further embodiment, but the present invention is not limited to or by the embodiments hereinbelow.

[Magnetic Storage Device]

Figure 1:
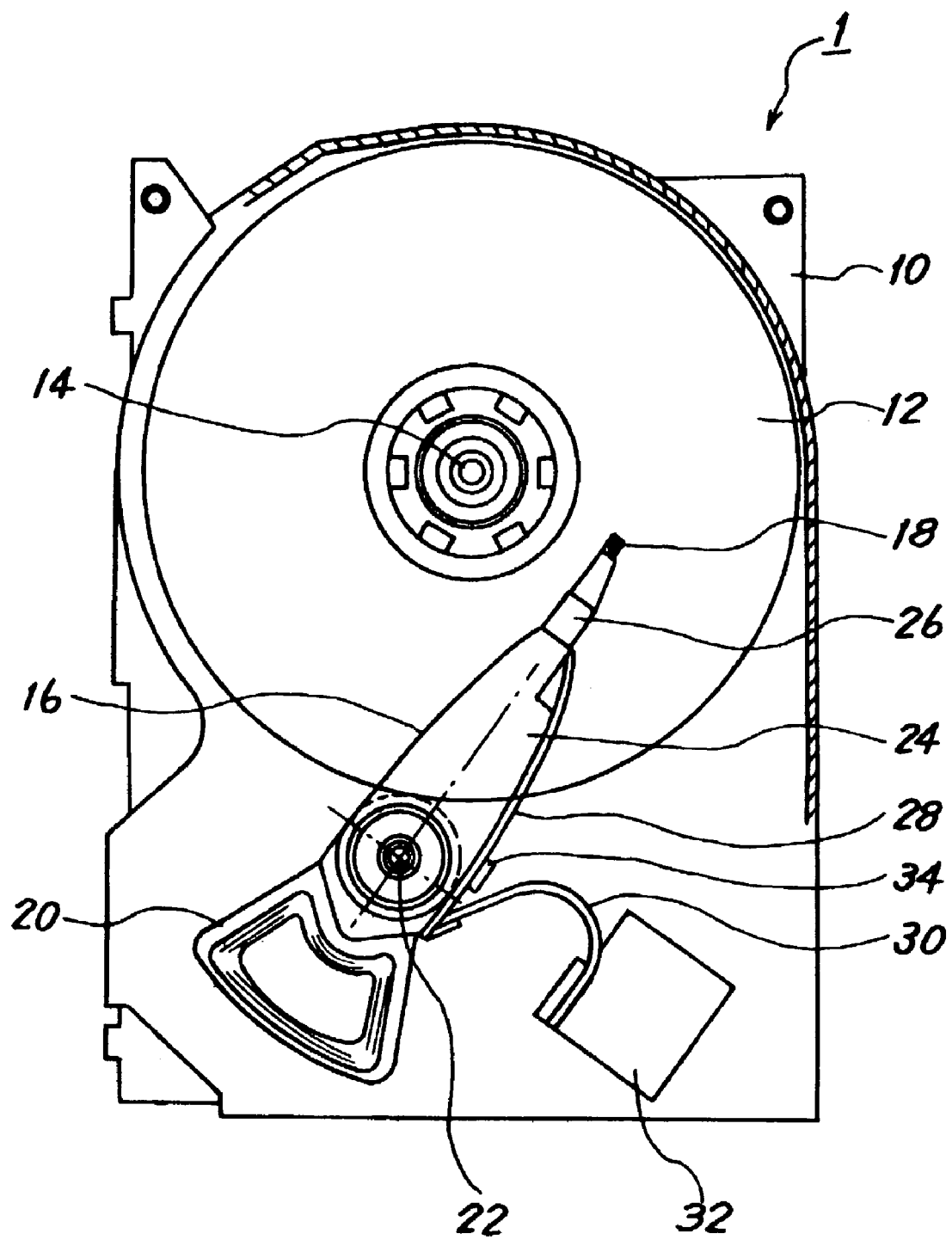
FIG. 1 is a top view of a magnetic storage device of an embodiment of the present invention.
Figure 2:
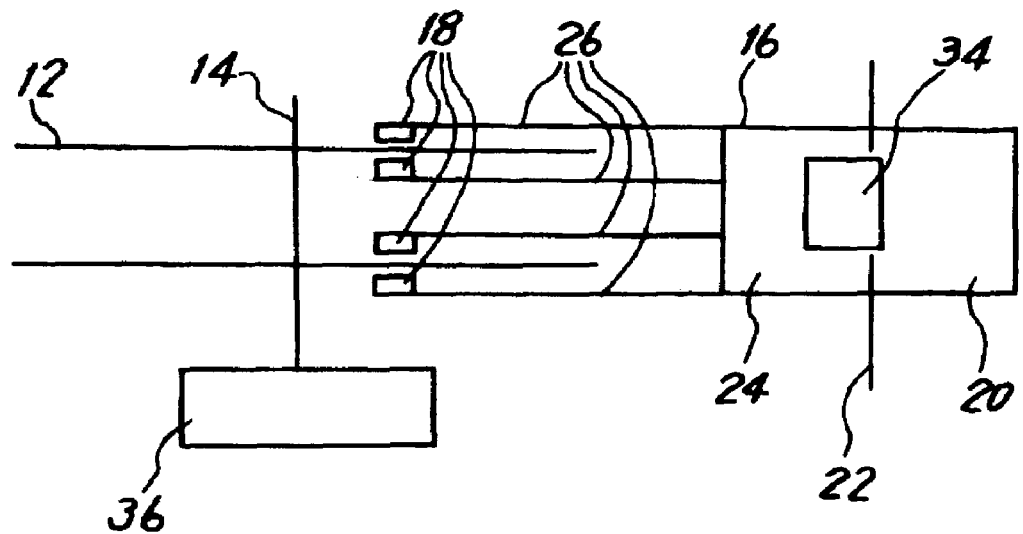
FIG. 2 is a sectional view of the magnetic storage device in FIG. 1.
Figure 3:
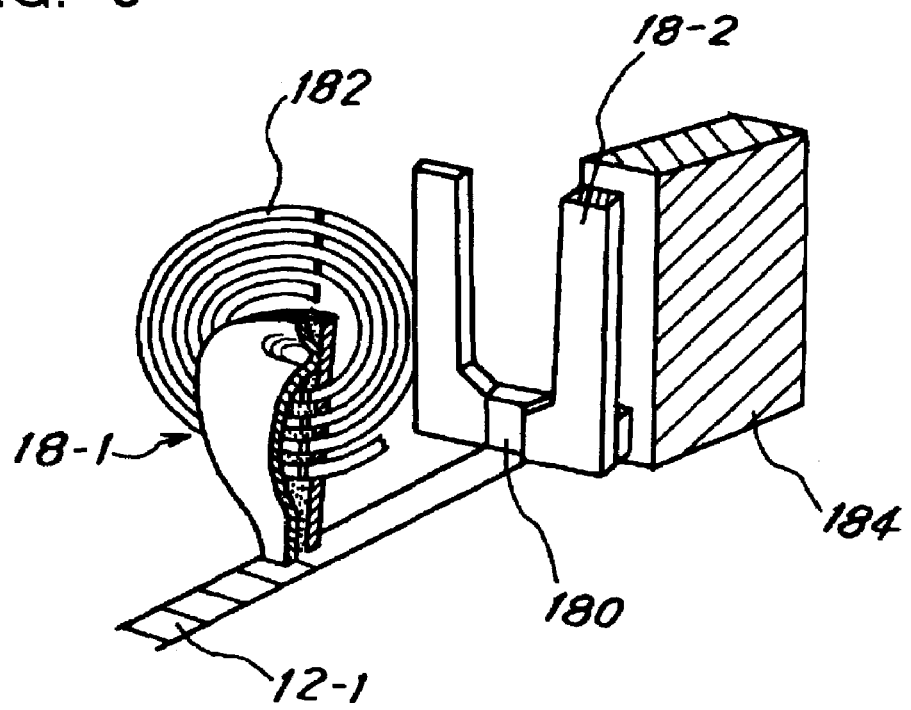
FIG. 3 is a constitutional view of the magnetic head of the magnetic storage device in FIG. 1.
Figure 4:
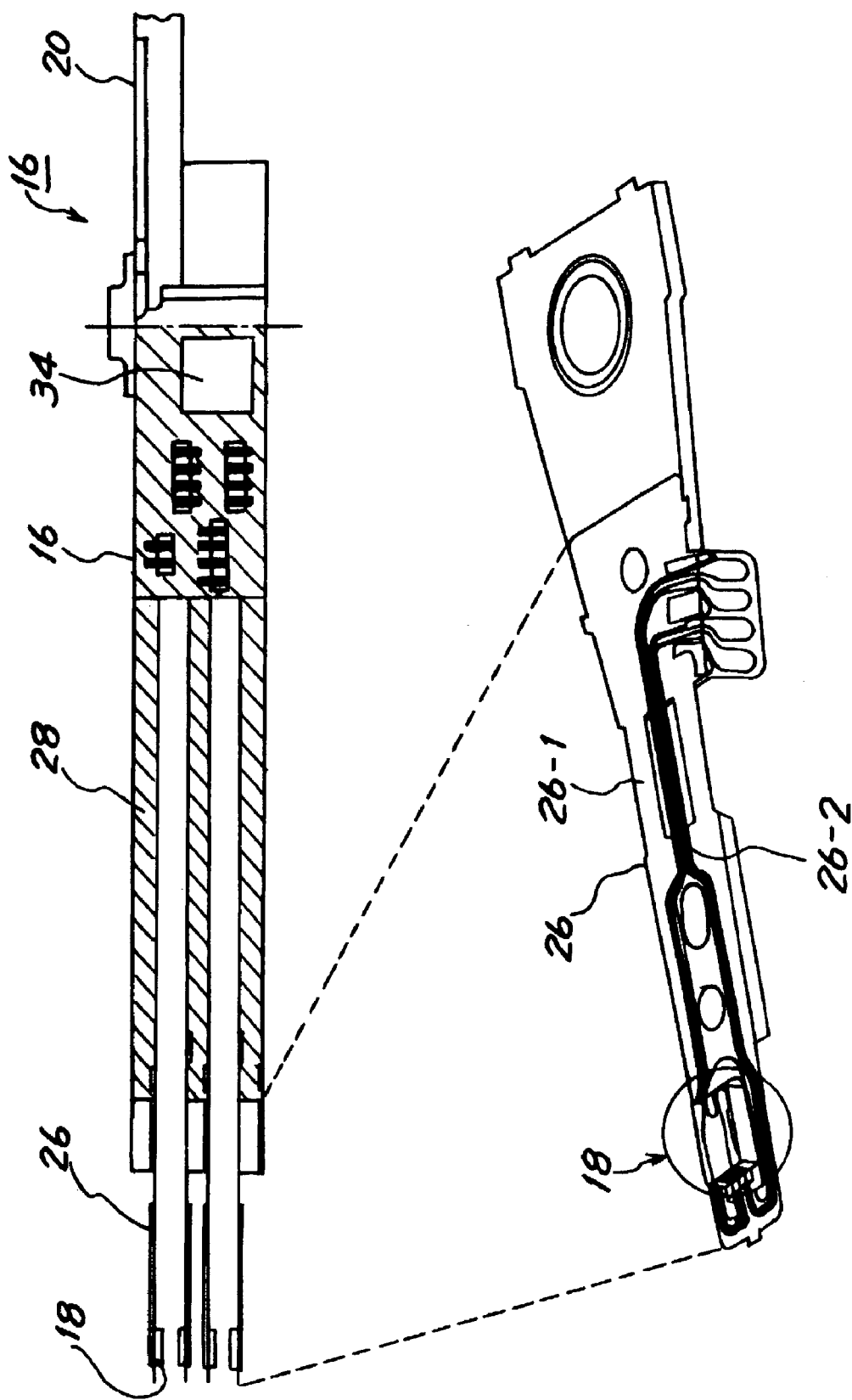
FIG. 4 is constitutional view of an actuator of the magnetic storage device in FIG. 1.

FIG. 1 is a top view of a magnetic storage device of an embodiment of the present invention; FIG. 2 is a sectional view of the magnetic storage device in FIG. 1; FIG. 3 is a constitutional view of the magnetic head in FIG. 1; and FIG. 4 is a constitutional view of the actuator in FIG. 1.

FIG. 1 shows a magnetic disk device as an example of a magnetic storage device. As shown in FIGS. 1 and 2, magnetic disks 12, which are magnetic storage media, are provided on a rotating shaft 14 of a spindle motor 36. The spindle motor 36 rotates the magnetic disks 12. An actuator 16 has, at the tip thereof, magnetic heads 18, and moves the magnetic heads 18 in the axial direction of the magnetic disks 12.

The actuator 16 comprises an arm 24, which rotates about a rotating shaft 22, a drive coil 20, which is provided at the rear end of the arm 24, and suspensions (gimbals) 26, which are provided at the tip of the arm 24. The magnetic heads 18 are provided on the suspensions 26.

A relay flexible cable 28 is provided on a lateral face of the arm 24, and a head IC 34 comprising a write driver is provided on this relay flexible cable 28. The relay flexible cable 28 is connected, via a flexible cable 30, to a printed board 32 which has a read/write controller provided thereon.

As shown in FIG. 1, the above components are enclosed within an enclosure 10. As shown in FIG. 3, the magnetic head 18 comprises a slider 184, a read element 18-2, and a write element 18-1. The magnetic head 18 is constituted by stacking the read element 18-2, which comprises a magneto resistance element 180, on the slider 184, and by stacking the write element 18-1, which comprises the write coil 182, on the read element 18-2.

The core width of the magneto resistance element 180 matches the width of a track 12-1 of the magnetic disk 12, being, for example, 0.3 to 0.4 micrometers, and the write coil 182 of the write element 18-1 is provided on the magneto resistance element 180 with an insulating layer interposed therebetween. The magneto resistance element 180 readily submits to the effects of the drive voltage of the write coil 182.

As shown in the side view of the arm 26 in FIG. 4, the head IC 34, which comprises a write driver, is provided on the relay flexible cable 28. Further, the suspension 26 is such that lead wires, which are connected to the magnetic head 18, are formed in the cable pattern 26-2 on a base 26-1 of the suspension 26. In other words, the head IC 34 and the magnetic head 18 are connected by a transmission line which is constituted by the cable of the relay flexible cable 28 and the cable of the suspension 26.

[Write Driver Circuit]

Figure 5:
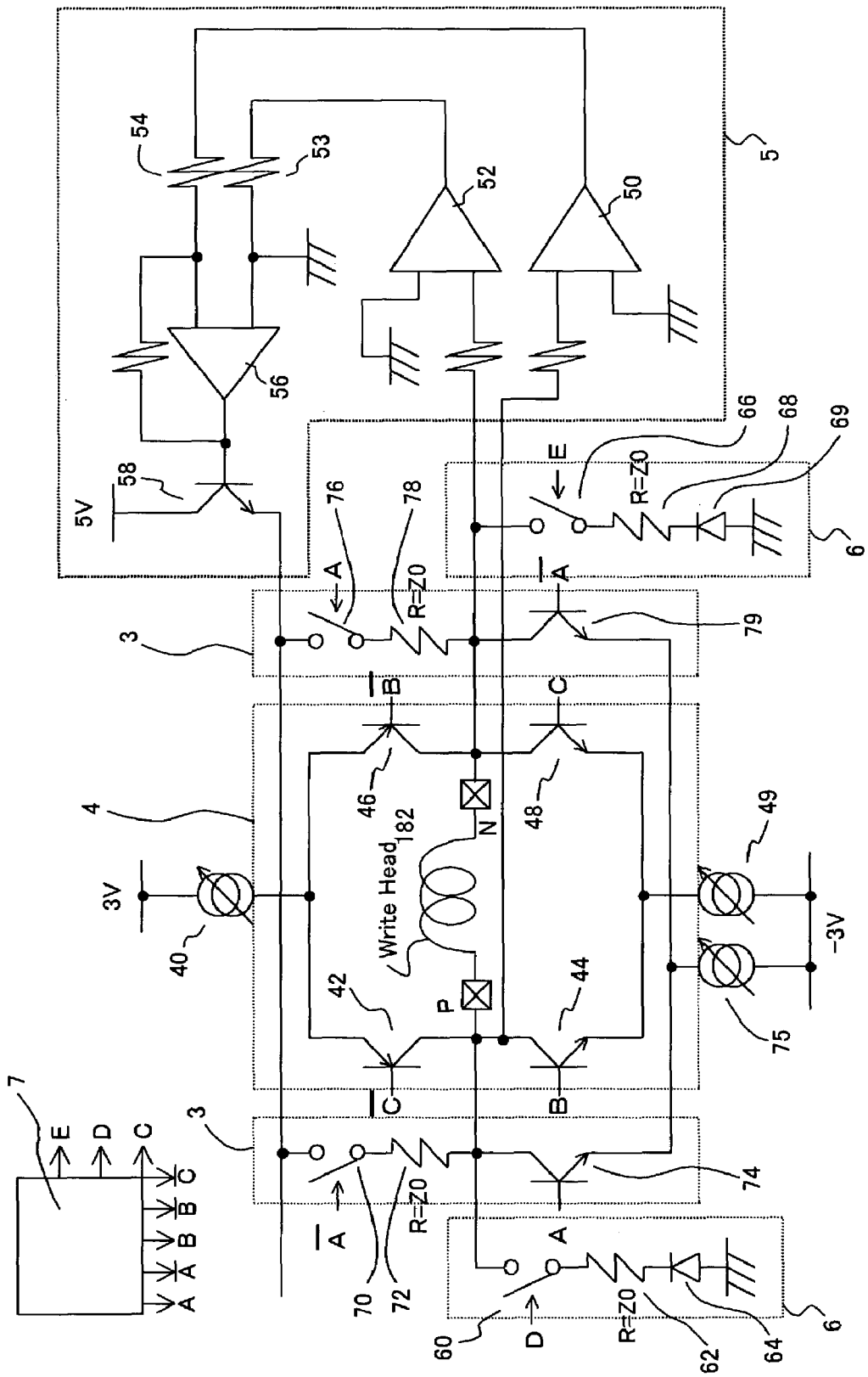
FIG. 5 is a circuit diagram of a write driver circuit according to an embodiment of the present invention.
Figure 6:
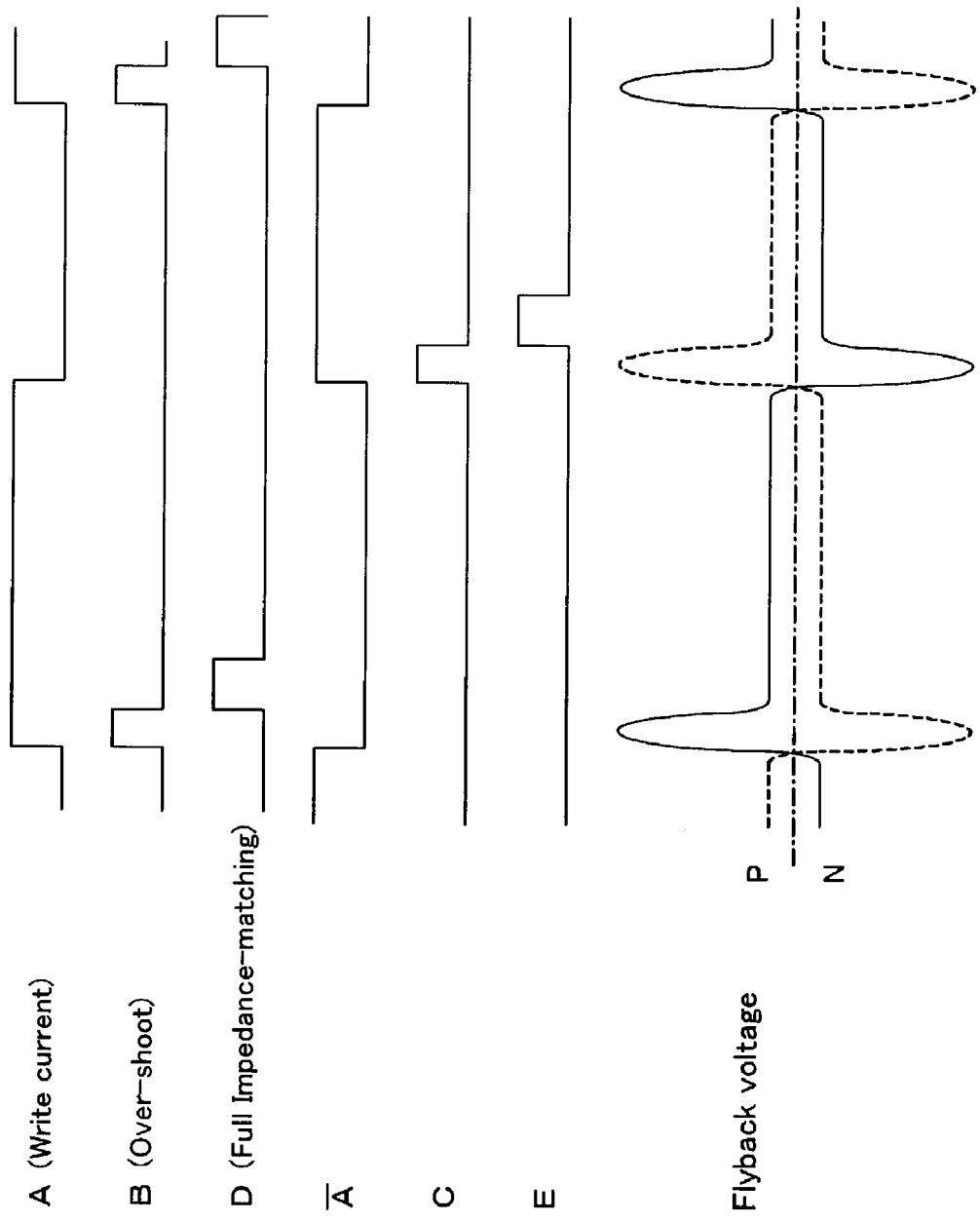
FIG. 6 is a timing chart for the waveform of each part of the circuit in FIG. 5.
Figure 7:
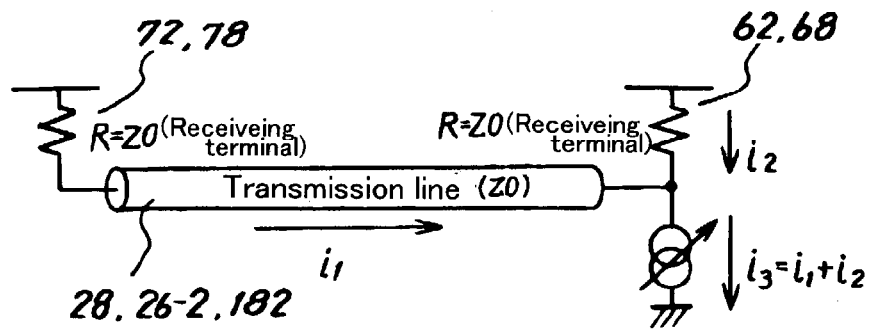
FIG. 7 is an explanatory view of the impedance matching in FIG. 5.

FIG. 5 is a constitutional diagram of a write driver circuit according to an embodiment of the present invention; FIG. 6 is a timing chart for drive timing in FIG. 5; and FIG. 7 is an explanatory view of the terminal resistors in FIG. 5.

In FIG. 5, the write driver circuit is constituted by an H bridge circuit 3, an overshoot circuit 4, a feedback circuit 5, a terminal circuit 6, and a drive control circuit 7. The H bridge circuit 3 is a circuit for causing a steady write current to flow from the positive power source to the write coil 182 via terminal resistors, and is constituted by switches 70, 76, terminal resistors (supply resistors) 72, 78, and NPN transistors 74, 79. These switches 70, 76 are constituted by an NPN transistor or an FET.

The overshoot circuit 4 is a circuit which causes an overshoot current to flow to the write coil 182 by means of vertically symmetrical supply voltages. This circuit 4 has the write coil 182 at the center thereof, is connected via current sources 40, 49 to vertically symmetrical voltage sources (+3V, −3V), and is constituted by providing PNP transistors 42, 46 on the positive side and NPN transistors 44, 48 on the negative side.

The feedback circuit 5 is a circuit which monitors the voltages at both ends of the write coil 182; determines the center voltage of the write coil 182 by means of the difference between these voltages; and provides feedback to permit variation of a supply voltage of the H bridge circuit 3. This feedback circuit 5 is constituted by a first differential amp 50, which, based on the ground potential, detects the voltage at a point P of the write coil 182; a second differential amp 52, which, based on the ground potential, detects the voltage at a point N of the write coil 182; a third differential amp 56, which receives the outputs of both the differential amps 50, 52 via input resistors 53, 54 to thereby obtain the difference between both voltages; and an NPN transistor 58, which, in accordance with an output from the third differential amp 56, regulates the supply voltage supplied to the H bridge circuit 3 from the positive power source (+5V).

In other words, the feedback circuit 5 monitors the voltages at both ends of the write coil 182, detects the center voltage of the write coil 182 from these voltages, feeds back the amount by which the center voltage differs from the ground potential, to the positive power source, and causes a change in the potential of the terminal resistors (supply resistors) 72, 78 of the H bridge circuit 3 to thereby control the center voltage of the write coil 182 such that same is equal to the ground (GND) potential.

The terminal circuit 6 is a circuit that implements double terminals by providing terminal resistors (receiving terminals) 62, 68 at a voltage one layer further from ground (GND) than diodes and by providing a connection with the terminal resistors at required times. This circuit 6 is constituted by switches 60, 62, each of which is connected to the write coil 182; terminal resistors (receiving resistors) 62, 68; and diodes 64, 69. The switches 60, 66 are constituted by NPN transistors or FETs.

Operation will now be described with reference to the waveform diagram in FIG. 6, in which the timing used to operate each circuit and the voltages at both ends of the write coil are shown. The drive signal A, and the drive signal $\overline{A}$ which is produced by inverting the drive signal A, in FIG. 6, are write drive signals like those used conventionally; the overshoot drive signals B, C are drive signals for operating the overshoot circuit 4; and the impedance matching drive signals D, B are drive signals for operating the terminal circuit 6. These drive signals are outputted by the drive control circuit 7.

First, by means of the write drive signal A, the switch 76 in the top right of the H bridge circuit 3 is turned ON (is connected), and the bottom left NPN transistor 74 is also turned ON, such that a steady write current flows from right to left in the write coil 182. This H bridge circuit 3 provides supply terminal resistors 72, 78, for the purpose of performing impedance matching, between the switches 70, 76 and the write coil 182. It is therefore possible to reduce write current ringing.

At the same time, the overshoot drive signal B is "high", and the PNP transistor 46 in the top right of the overshoot circuit 4 is turned ON and the NPN transistor 44 in the bottom left is also turned ON. Since the overshoot circuit 4 has the write coil 182, which constitutes the ground (GND), at the center thereof, and has a vertically symmetrical circuit constitution, the overshoot circuit 4 is capable of implementing an overshoot in the form of a vertically symmetrical feedback voltage.

However, since no consideration is given here to reflection, there is a requirement to make the time interval, during which the circuit 4 is turned ON, a short time interval in which the effects of reflection do not come to bear. In other words, the time interval during which the circuit 4 can be turned ON is determined in accordance with the impedance of the transmission line in FIG. 7. That is, while there are no reflection effects, the overshoot drive signal B is made "low".

Furthermore, at the same time as changing the drive signal B to "low", the terminal resistor drive signal D is changed to "high", and the switch 60 on the left of the terminal resistor circuit 6 is turned ON. Impedance matching of the double terminals takes place at the time this switch is turned ON. As a result, the task of accelerating the overshoot settling time is accomplished.

In other words, the terminal resistor circuit 6 is a circuit which establishes double terminals, since, with only the resistors 72, 78 of the H bridge circuit 3, only single terminals (supply terminals) are produced. Immediately after the overshoot circuit 4 is turned OFF (that is, at the time the reflection effects begin), the terminal resistor circuit 6 is turned ON (is connected), and a potential equal to the terminal voltage (current source side) of the write coil 182 is supplied to the receiving terminal resistor 62, to thereby implement a double terminal without bringing about a variation in the current drawn from the current source 75.

Further, this terminal resistor circuit 6 is shown with a simplified circuit constitution. That is, the voltages at both ends of the write coil 182 are normally potentials of approximately +250 mV to 450 mV, and the current, which flows to the terminal resistors is desirably changed in accordance with the write current value. In this example, it is also possible to simplify the circuit such that the current supplied to the terminal resistors is uniformly set at approximately 700 mV (corresponding to a diode level) by means of a diode 64.

In addition, at a time when no reflection effects are present, the terminal resistor drive signal D is made LOW, and the terminal resistor circuit 6 is disconnected. However, it is also possible to not disconnect the terminal resistor circuit 6 particularly in a case where current accuracy or the like is not important.

The above description was with regard to a case where a write current flows from right to left in the write coil 182, but a case where a write current flows from left to right in the write coil 182 is also similar, in which case the inverted signal A^, which is produced by inverting the write drive signal A, changes to high, the switch 70 in the top left of the H bridge circuit 3 is turned ON (is connected), and the bottom right NPN transistor 79 is also turned ON, such that a steady write current flows from left to right in the write coil 182. This H bridge circuit 3 provides supply terminal resistors 72, 78, for the purpose of performing impedance matching, between the switches 70, 76 and the write coil 182. It is therefore possible to reduce write current ringing.

At the same time, the overshoot drive signal C is "high", and the PNP transistor 42 in the top left of the overshoot circuit 4 is turned ON and the NPN transistor 48 in the bottom right is also turned ON. Since the overshoot circuit 4 has the write coil 182, which constitutes the ground (GND), at the center thereof, and has a vertically symmetrical circuit constitution, the overshoot circuit 4 is capable of implementing an overshoot in the form of a vertically symmetrical feedback voltage.

However, since no consideration is given here to reflection, there is a requirement to make the time interval, during which the circuit 4 is turned ON, a short time interval in which the effects of reflection do not come to bear. In other words, the time interval during which the circuit 4 can be turned ON is determined in accordance with the impedance of the transmission line in FIG. 7. That is, while there are no reflection effects, the overshoot drive signal C is made "low".

Furthermore, at the same time as changing the drive signal C to "low", the terminal resistor drive signal E is changed to "high", and the switch 66 on the right of the terminal resistor circuit 6 is turned ON. Impedance matching of the double terminals takes place at the time this switch is turned ON.

Therefore, an H bridge circuit 3, which drives a write coil in both directions and causes a steady write current to flow, is separately provided with an H bridge circuit 4 generating an overshoot. And since the potentials of the positive power source and negative power source of this bridge circuit 4 are made equal, the flyback (overshoot) voltage can be made vertically symmetrical. It is therefore possible to reduce the production of common noise, and since coupling with the read element is prevented, it is possible to prevent the destruction of the read element and to shorten the write to read recovery time of the read element.

Further, a feedback circuit 5, which controls a voltage of the write driver 3 by monitoring the voltages at both ends of the write coil, determining the center voltage of the write coil, and comparing these voltages with the ground (GND) potential, is added. As a result, even if the vertical circuit of the write driver 3 is not symmetrical, and even if there is a difference between the potentials of the power sources of the write driver 3, it is possible to control the center potential of the write coil so that this center potential is held at ground (GND) potential. It is thus possible to reduce common noise at the time of a mode change from write to read, to prevent coupling with the read element, and to prevent the destruction of the read element.

Further, when a steady write current flows in the write coil, the write current flows from the positive power source (low impedance) via a resistor (supply terminal). A value equal to the impedance of the transmission line of the write head is employed as the value of this resistance, and the write current quantity is controlled by the power source 75 below the write driver 3. Consequently, the write current rises quickly, and write waveform ringing and the like can be prevented.

In such terminal control, as shown in FIG. 7, the double terminals of the terminals proper are most suitable. However, in a simple implementation of the double terminals, it is necessary to cause a current (i3), which is equal to two times a current (i1) flowing in the write coil 182 proper, to flow using the lower power source 75. As shown in FIG. 7, this current (i3) is necessary due to the requirement to cause an equal current (i2) to flow to the receiving terminals.

According to the present invention, double terminals are established by providing switches 60, 66, which set receiving terminals 62, 68 at the same potential as the terminal voltages (current source side) of the write coil 182 only at a time when reflection effects are present, and by loading terminal resistors 62, 68 only at such time. Therefore, at required times, in addition to constituting double terminals, terminal resistors 62, 68 are also introduced at a potential which is equal to the terminal voltages (current source side) of the write coil 182, meaning that there is no need to cause a current to flow, which is equal to two times the current flowing in the write coil 182, by means of the lower power source 75. Moreover, an effect is also produced whereby it is possible, by means of the double terminals, to shorten the overshoot settling time interval.

[Further Embodiment]

Figure 8:
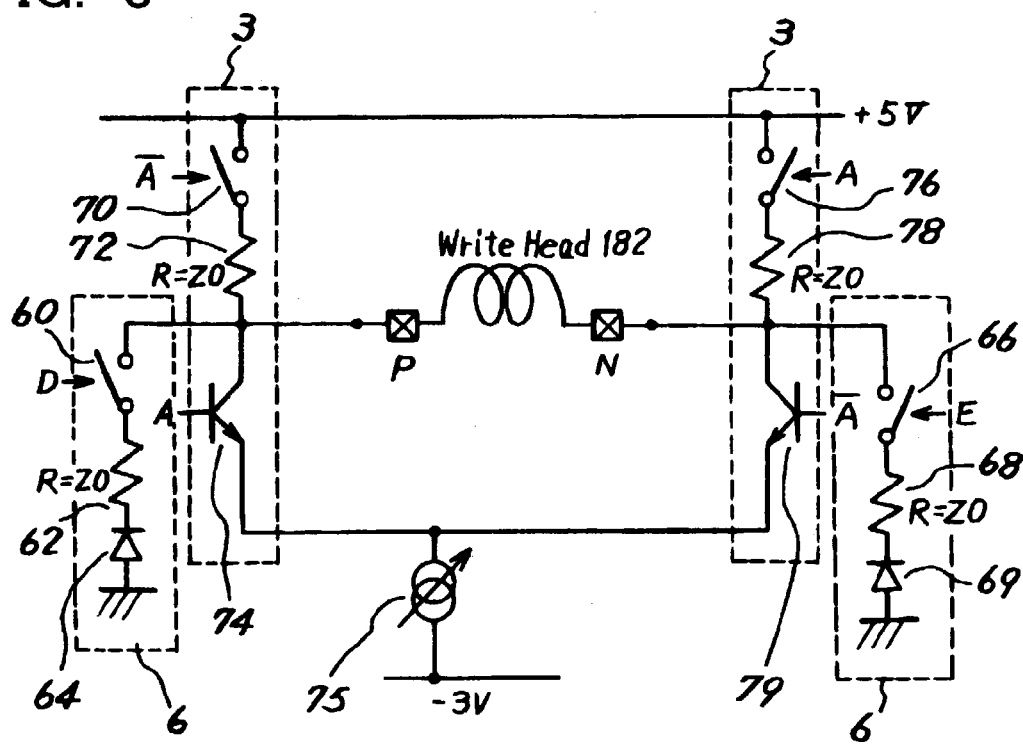
FIG. 8 is a circuit diagram of a write driver circuit of a further embodiment of the present invention.

FIG. 8 is a constitutional view of a write driver circuit of a further embodiment of the present invention. In this figure, elements which are the same as those described using FIG. 5 are indicated using the same symbols. The write driver circuit in FIG. 8 is constituted by an H bridge circuit 3, and a terminal circuit 6. The H bridge circuit 3 is a circuit for causing a steady write current to flow from the positive power source to the write coil 182 via terminal resistors, and is constituted by switches 70, 76, terminal resistors (supply resistors) 72, 78, and NPN transistors 74, 79. These switches 70, 76 are constituted by an NPN transistor or an FET.

The terminal circuit 6 is a circuit that implements double terminals by providing terminal resistors (receiving termi- nals) 62, 68 at a voltage one layer further from ground (GND) than diodes and by providing a connection with the terminal resistors at required times. This circuit 6 is consti- tuted by switches 60, 62, each of which is connected to the write coil 182; terminal resistors (receiving resistors) 62, 68; and diodes 64, 69. The switches 60, 66 are constituted by NPN transistors or FETs.

In other words, the constitution in FIG. 8 is produced by removing the overshoot circuit 4 and the feedback circuit 5 from the constitution in FIG. 5. In comparison with a conventional constitution, the circuit in FIG. 8 implements impedance matching. That is, when a write current is flow- ing in the write coil, since the write current flows from the positive power source (low impedance) via a resistor (supply terminal), the write current rises quickly, and write wave- form ringing and the like can be prevented.

Further, double terminals are established by providing switches 60, 66, which set receiving terminals 62, 68 at the same potential as the terminal voltages (current source side) of the write coil 182 only at a time when reflection effects are present, and by loading terminal resistors 62, 68 only at such time. Therefore, at required times, in addition to constituting double terminals, terminal resistors 62, 68 are also introduced at a potential which is equal to the terminal voltages (current source side) of the write coil 182, meaning that there is no need to cause a current to flow, which is equal to two times the current flowing in the write coil 182, by means of the lower power source 75. Moreover, an effect is also produced whereby it is possible, by means of the double terminals, to shorten the overshoot settling time interval.

Figure 9:
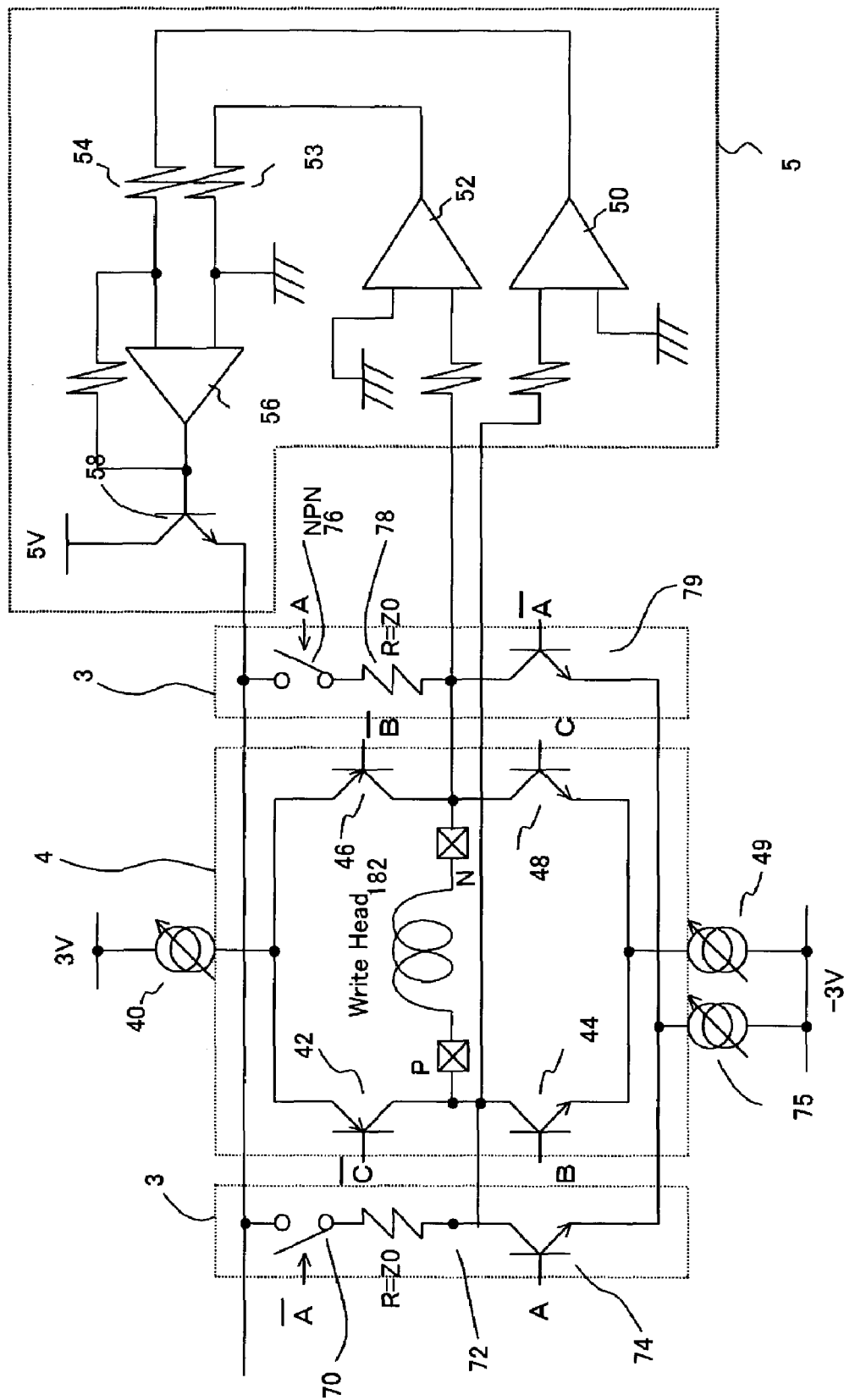
FIG. 9 is circuit diagram of a write driver circuit of yet another embodiment of the present invention.
Figure 10:
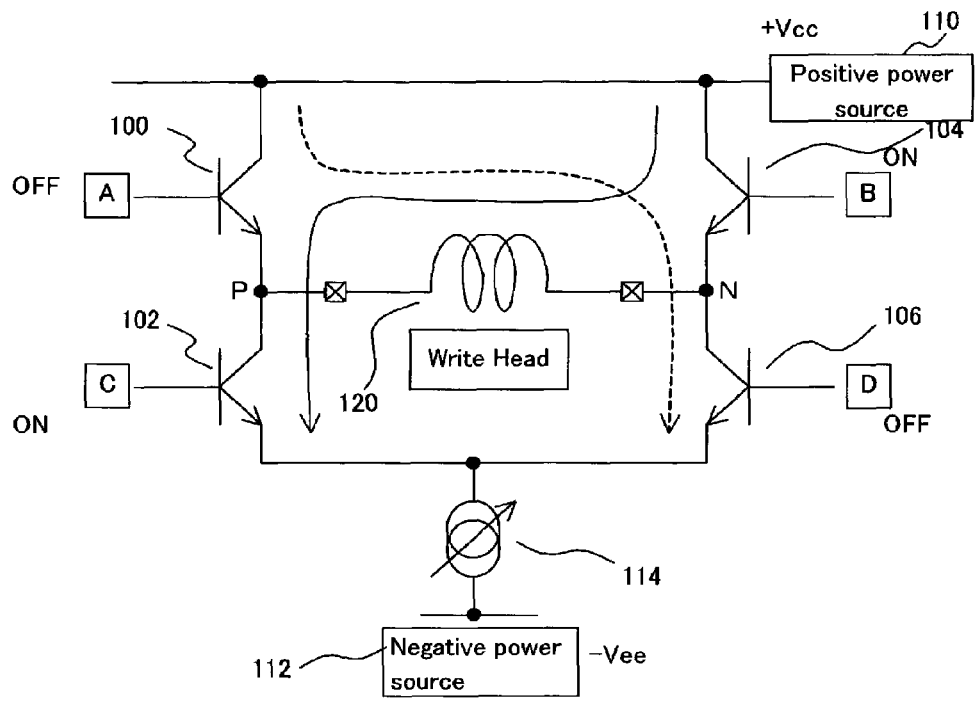
FIG. 10 is a constitutional view of a conventional write driver circuit.
Figure 11:
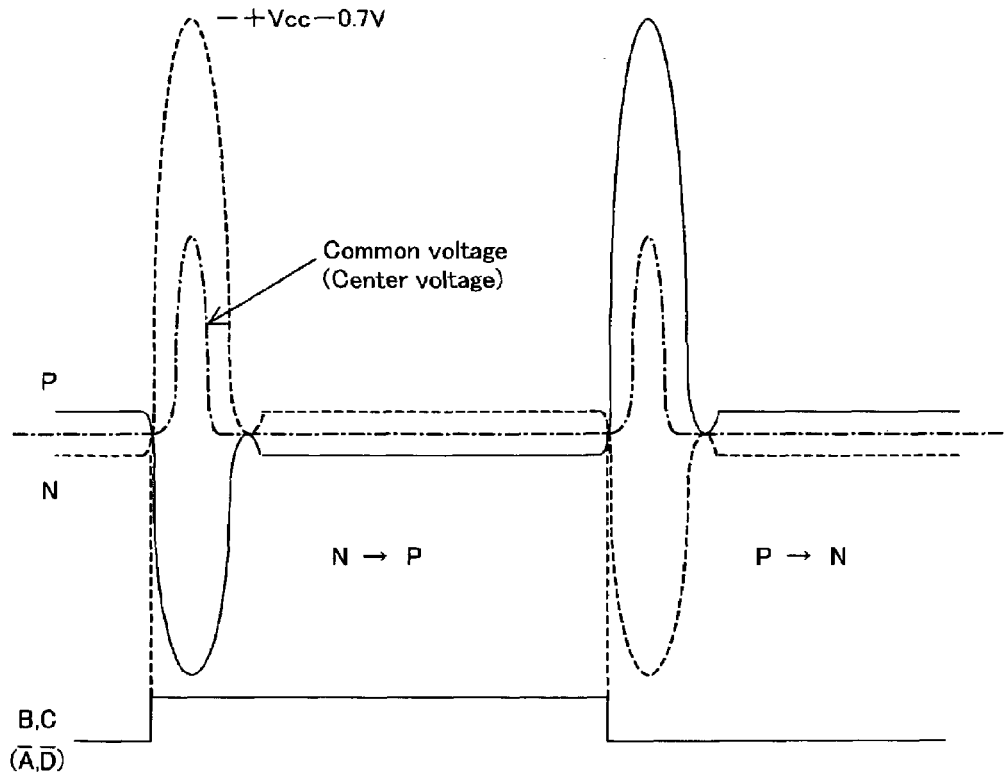
FIG. 11 is an explanatory view of the drive voltage of the conventional write driver circuit.

FIG. 9 is a constitutional view of a write driver circuit of yet another embodiment of the present invention. In this figure, elements which are the same as those described using FIG. 5 are indicated using the same symbols. The write driver circuit in FIG. 9 is constituted by an H bridge circuit 3, an overshoot circuit 4, and a feedback circuit 5. The H bridge circuit 3 is a circuit for causing a steady write current to flow from the positive power source to the write coil 182 via terminal resistors, and is constituted by switches 70, 76, terminal resistors (supply resistors) 72, 78, and NPN tran- sistors 74, 79. These switches 70, 76 are constituted by an NPN transistor or an FET.

The overshoot circuit 4 is a circuit which causes an overshoot current to flow to the write coil 182 by means of vertically symmetrical supply voltages. This circuit 4 has the write coil 182 at the center thereof, is connected via current sources 40, 49 to vertically symmetrical voltage sources (+3V, −3V), and is constituted by providing PNP transistors 42, 46 on the positive side and NPN transistors 44, 48 on the negative side.

The feedback circuit 5 is a circuit which monitors the voltages at both ends of the write coil 182; determines the center voltage of the write coil 182 by means of the difference between these voltages; and provides feedback to permit variation of a supply voltage of the H bridge circuit 3. This feedback circuit 5 is constituted by a first differential amp 50, which, based on the ground potential, detects the voltage at a point P of the write coil 182; a second differ- ential amp 52, which, based on the ground potential, detects the voltage at a point N of the write coil 182; a third differential amp 56, which receives outputs of both the differential amps 50, 52 via input resistors 53, 54 to obtain the difference between both voltages; and an NPN transistor 58, which, in accordance with an output from the third differential amp 56, regulates the supply voltage supplied to the H bridge circuit 3 from the positive power source (+5V).

In other words, the feedback circuit 5 monitors the voltages at both ends of the write coil 182, detects the center voltage of the write coil 182 from these voltages, feeds back the amount by which the center voltage differs from the ground potential, to the positive power source, and causes a change in the potential of the terminal resistors (supply resistors) 72, 78 of the H bridge circuit 3 to thereby control the center voltage of the write coil 182 such that same is equal to the ground (GND) potential.

The example in FIG. 9 is produced by removing the terminal circuit 6 from the constitution in FIG. 5. Therefore, in a circuit in which impedance matching is not required, noise can be prevented from entering the read element.

In the embodiment in FIG. 8 described above, the feedback circuit 5 can be added according to requirements. In addition, in the embodiment in FIG. 9, the resistors 72, 78 introduced to the write driver 3 can also be removed.

Moreover, a magnetic storage device has been described by way of a magnetic disk device, but the present invention can also be applied to other magnetic storage devices such as a magnetic tape device.

The present invention was described by means of embodiments hereinabove, but a variety of modifications are possible within the spirit of the present invention which do not depart from the technical scope of the present invention.

With a conventional write driver circuit, the common voltage of the write element varies, which constitutes the principal factor in the production of a noise effect acting on the adjacent read element, in the destruction of the MR head (read head) and the like, and in the delaying of the write to read recovery time. However, according to the present invention, because a variation in the common voltage of the write element is reduced, it is possible to prevent effects from acting on the adjacent read element. As a result, destruction of the MR head (read head) and the like, which is the read element, can be prevented, and delaying of the write to read recovery time can also be reduced.

Furthermore, since the write driver circuit is provided with an impedance matching function, even when high speed recording is performed, it is possible to prevent a slow rise in the write waveform and also to prevent write waveform ringing.

Moreover, by engaging double terminals, not ordinarily, but rather at required times, and, by limiting unnecessary current to a minimum, it is possible to implement a write driver circuit that possesses an impedance matching function while conserving electric power. In addition, since it is possible to adopt a circuit constitution that is an extension of a conventional circuit, circuit implementation is straightforward.

It is thus possible to improve the read performance of the magnetic storage device and the life span thereof, and high speed recording is also permitted.

What is claimed is:

1. A magnetic head driver circuit for driving a write element performing magnetic recording on a magnetic recording medium, comprising:
   a write driver comprising a first pair of switch elements for directing a write current in one direction in a write coil of said write element; and a second pair of switch elements for directing a write current in a reverse direction in said write coil; and
   an overshoot circuit, which is connected to a positive power source and a negative power source of the same potential, for adding an overshoot current to said write coil in sync with the operation of said first and second pairs of switch elements, said overshoot current preventing a variation in a common potential of said write coil.

2. The magnetic head driver circuit according to claim 1, wherein said overshoot circuit comprises:
   a third pair of switch elements for directing an overshoot current in said one direction to said write coil, in accordance with a drive signal in sync with a write drive signal of said first pair of switch elements; and
   a fourth pair of switch elements for directing an overshoot current in said reverse direction through said write coil, in accordance with a drive signal in sync with a write drive signal of said second pair of switch elements.

3. A magnetic head driver circuit for driving a write element performing magnetic recording on a magnetic recording medium, comprising:
   a write driver comprising a first pair of switch elements for directing a write current in one direction in a write coil of said write element; and a second pair of switch elements for directing a write current in a reverse direction in said write coil;
   an overshoot circuit, which is connected to a positive power source and a negative power source of the same potential, for adding an overshoot current to said write coil, in sync with the operation of said first and second pairs of switch elements, said overshoot current preventing a variation in the common potential of said write coil; and
   a feedback circuit for monitoring the voltages at both ends of said write coil and controlling a supply voltage which is applied to said write driver.

4. A magnetic storage device comprising:
   a write element for performing magnetic recording on a magnetic recording medium;
   a read element for reading the magnetic recording medium;
   a write driver comprising a first pair of switch elements for directing a write current in one direction in a write coil of said write element; and a second pair of switch elements for directing a write current in a reverse direction in said write coil; and
   an overshoot circuit, which is connected to a positive power source and a negative power source of the same potential, for adding an overshoot current to said write coil in sync with the operation of said first and second pairs of switch elements, said overshoot current preventing a variation in a common potential of said write coil.

5. The magnetic storage device according to claim 4, wherein said overshoot circuit comprises:
   a third pair of switch elements for directing an overshoot current in said one direction to said write coil, in accordance with a drive signal in sync with a write drive signal of said first pair of switch elements; and
   a fourth pair of switch elements for directing an overshoot current in said reverse direction through said write coil, in accordance with a drive signal in sync with a write drive signal of said second pair of switch elements.

6. A magnetic storage device comprising:
   a write element for performing magnetic recording on a magnetic recording medium;
   a read element for reading the magnetic recording medium;
   a write driver comprising a first pair of switch elements for directing a write current in one direction in a write coil of said write element; and a second pair of switch elements for directing a write current in a reverse direction in said write coil;

an overshoot circuit, which is connected to a positive power source and a negative power source of the same potential, for adding an overshoot current to said write coil, in sync with the operation of said first and second pairs of switch elements, said overshoot current preventing a variation in the common potential of said write coil; and a feedback circuit for monitoring the voltages at both ends of said write coil and controlling a supply voltage which is applied to said write driver.

* * * * *